(12) United States Patent
Thomassin et al.

(10) Patent No.: US 9,797,297 B2
(45) Date of Patent: Oct. 24, 2017

(54) COMPOUND ENGINE ASSEMBLY WITH COMMON INLET

(71) Applicant: Pratt & Whitney Canada Corp., Longueuil (CA)

(72) Inventors: Jean Thomassin, Ste Julie (CA); Sebastien Bolduc, St-Bruno (CA); Bruno Villeneuve, Boucherville (CA); Stephane Berube, St-Philippe (CA); Mike Fontaine, Boucherville (CA); David Gagnon-Martin, Longueuil (CA); Andre Julien, Ste-Julie (CA); Mark Cunningham, Montreal (CA); Serge Lafortune, Mascouche (CA); Pierre-Yves Legare, Chambly (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 274 days.

(21) Appl. No.: 14/806,918

(22) Filed: Jul. 23, 2015

(65) Prior Publication Data

US 2016/0245154 A1    Aug. 25, 2016

Related U.S. Application Data

(60) Provisional application No. 62/118,891, filed on Feb. 20, 2015.

(51) Int. Cl.
*F02B 29/04* (2006.01)
*F01C 1/22* (2006.01)
(Continued)

(52) U.S. Cl.
CPC ............ *F02B 29/0493* (2013.01); *F01C 1/22* (2013.01); *F01C 11/002* (2013.01);
(Continued)

(58) Field of Classification Search
CPC ...... F02B 29/04; F02B 29/0493; F02B 41/10; F02B 33/34; F02B 53/00; F02B 61/04; F02B 2053/005
(Continued)

(56) References Cited

U.S. PATENT DOCUMENTS 1,938,537 A   12/1933   Davis
2,098,947 A   11/1937   Roy et al.
(Continued)

FOREIGN PATENT DOCUMENTS

CN   104234814   12/2014
DE      730494    1/1943
(Continued)

*Primary Examiner* — Patrick Maines
(74) *Attorney, Agent, or Firm* — Norton Rose Fulbright Canada (57) ABSTRACT

A compound engine assembly including an air conduit having an inlet in fluid communication with ambient air around the compound engine assembly, a compressor having an inlet in fluid communication with the air conduit, an engine core including at least one rotary internal combustion engine and having an inlet in fluid communication with an outlet of the compressor, a turbine section having an inlet in fluid communication with an outlet of the engine core and configured to compound power with the engine core; and at least one heat exchanger in fluid communication with the air conduit, each heat exchanger configured to circulate a fluid of the engine assembly in heat exchange relationship with an airflow from the air conduit circulating therethrough. A method of supplying air to a compound engine assembly is also discussed.

20 Claims, 8 Drawing Sheets

(51) Int. Cl.
*F01C 11/00* (2006.01)
*F02B 33/34* (2006.01)
*F02B 41/10* (2006.01)
*F02B 61/04* (2006.01)
*F01D 13/00* (2006.01)
*F02K 5/00* (2006.01)
*F02C 6/12* (2006.01)
*F02B 53/00* (2006.01)

(52) U.S. Cl.
CPC .......... *F01C 11/008* (2013.01); *F01D 13/003* (2013.01); *F02B 29/0412* (2013.01); *F02B 29/0418* (2013.01); *F02B 33/34* (2013.01); *F02B 41/10* (2013.01); *F02B 53/00* (2013.01); *F02B 61/04* (2013.01); *F02C 6/12* (2013.01); *F02K 5/00* (2013.01); *F02B 2053/005* (2013.01); *F05D 2220/40* (2013.01); *Y02T 10/146* (2013.01); *Y02T 10/163* (2013.01); *Y02T 10/17* (2013.01)

(58) Field of Classification Search
USPC ....................................................... 60/605.1
See application file for complete search history.

(56) References Cited

U.S. PATENT DOCUMENTS

| | | |
|---|---|---|
| 2,164,669 A | 7/1939 | Rogers |
| 2,214,669 A | 9/1940 | Fedden et al. |
| 2,244,594 A | 6/1941 | Amiot |
| 2,249,948 A | 7/1941 | Dornier |
| 2,270,912 A | 1/1942 | Theodorsen |
| 2,403,917 A | 7/1946 | Gille |
| 2,455,385 A | 12/1948 | Schairer |
| 2,509,804 A | 5/1950 | Brewster |
| 2,510,790 A | 6/1950 | Arnold |
| 2,525,804 A | 10/1950 | Kellogg |
| 2,631,429 A | 3/1953 | Jacklin |
| 2,678,542 A | 5/1954 | Stanton |
| 2,752,111 A | 6/1956 | Schairer |
| 2,946,192 A | 7/1960 | Hambling |
| 3,397,684 A * | 8/1968 | Scherenberg ....... F02B 29/0412 123/142.5 R |
| 3,398,538 A | 8/1968 | Hall et al. |
| 3,782,349 A | 1/1974 | Kamo et al. |
| 3,888,411 A | 6/1975 | Florine |
| 3,989,186 A | 11/1976 | Michael |
| 3,990,422 A | 11/1976 | Watson et al. |
| 4,815,282 A * | 3/1989 | Wilkinson ............. F02B 37/001 60/247 |
| 4,924,826 A | 5/1990 | Vinson |
| 4,999,994 A | 3/1991 | Rud et al. |
| 5,121,598 A | 6/1992 | Butler |
| 5,284,012 A | 2/1994 | Laborie et al. |
| 5,351,476 A | 10/1994 | Laborie et al. |
| 5,375,580 A | 12/1994 | Stolz et al. |
| 5,408,979 A | 4/1995 | Backlund et al. |
| 5,729,969 A * | 3/1998 | Porte ................. F02C 6/08 60/226.1 |
| 5,730,089 A * | 3/1998 | Morikawa .......... B60H 1/00885 123/41.14 |
| 5,987,877 A | 11/1999 | Steiner |
| 6,000,210 A * | 12/1999 | Negulescu ............ B64D 33/10 60/39.08 |
| 6,092,361 A | 7/2000 | Romani |
| 6,142,108 A | 11/2000 | Blichmann |
| 6,276,138 B1 | 8/2001 | Welch |
| 6,282,881 B1 | 9/2001 | Beutin et al. |
| 6,311,678 B1 | 11/2001 | Lepoutre |
| 6,343,572 B1 | 2/2002 | Pfaff et al. |
| 6,405,686 B1 * | 6/2002 | Wetergard ............ F02M 31/04 123/25 A |
| 6,622,692 B2 | 9/2003 | Yomogida |
| 6,651,929 B2 | 11/2003 | Dionne |
| 6,729,156 B2 | 5/2004 | Sauterleute et al. |
| 6,786,036 B2 | 9/2004 | Kight |
| 6,942,181 B2 | 9/2005 | Dionne |
| 7,195,002 B2 | 3/2007 | Tsutsui |
| 7,267,097 B2 | 9/2007 | Tsutsui et al. |
| 7,364,117 B2 | 4/2008 | Dionne |
| 7,552,709 B2 | 6/2009 | Fujii |
| 7,654,087 B2 | 2/2010 | Ullyott |
| 7,690,188 B2 | 4/2010 | Schwarz et al. |
| 7,690,189 B2 | 4/2010 | Schwarz et al. |
| 7,725,238 B2 | 5/2010 | Perkins |
| 7,753,036 B2 | 7/2010 | Lents et al. |
| 7,806,796 B2 | 10/2010 | Zhu |
| 7,810,312 B2 | 10/2010 | Stretton et al. |
| 7,856,824 B2 | 12/2010 | Anderson et al. |
| 7,861,512 B2 | 1/2011 | Olver |
| 8,025,045 B2 | 9/2011 | Pettersson et al. |
| 8,312,859 B2 | 11/2012 | Rom et al. |
| 8,490,382 B2 | 7/2013 | Zysman et al. |
| 8,602,088 B2 | 12/2013 | Solntsev et al. |
| 8,776,952 B2 | 7/2014 | Schwarz et al. |
| 8,833,313 B2 | 9/2014 | Lockwood et al. |
| 8,961,114 B2 | 2/2015 | Ruthemeyer |
| 8,978,628 B2 | 3/2015 | Reynolds et al. |
| 9,010,114 B2 | 4/2015 | Krug et al. |
| 9,200,563 B2 | 12/2015 | Thomassin |
| 9,239,005 B2 | 1/2016 | Strecker et al. |
| 9,328,650 B2 | 5/2016 | Reynolds et al. |
| 9,376,996 B2 | 6/2016 | Seki |
| 9,399,947 B2 | 7/2016 | Schulz et al. |
| 2003/0015183 A1 * | 1/2003 | Sealy .................. F02B 27/02 123/563 |
| 2004/0123849 A1 | 7/2004 | Bryant |
| 2005/0188943 A1 | 9/2005 | Gonzalez et al. |
| 2007/0240415 A1 | 10/2007 | Julien et al. |
| 2009/0314005 A1 | 12/2009 | Messmer |
| 2010/0071639 A1 | 3/2010 | Wegner et al. |
| 2011/0296832 A1 * | 12/2011 | Pursifull ................ F02M 26/33 60/605.2 |
| 2013/0028768 A1 | 1/2013 | Fontaine |
| 2013/0152581 A1 | 6/2013 | Lofgren |
| 2014/0000279 A1 | 1/2014 | Brousseau et al. |
| 2014/0020380 A1 * | 1/2014 | Thomassin ............ F02C 6/20 60/605.1 |
| 2014/0020381 A1 | 1/2014 | Bolduc et al. |
| 2015/0198092 A1 | 7/2015 | Weiner |
| 2016/0047274 A1 | 2/2016 | Woolworth et al. |
| 2016/0084115 A1 | 3/2016 | Ludewig et al. |
| 2016/0102610 A1 | 4/2016 | Caruel et al. |

FOREIGN PATENT DOCUMENTS

| | | |
|---|---|---|
| DE | 853388 | 10/1952 |
| DE | 19524733 | 1/1997 |
| EP | 2011962 | 1/2009 |
| EP | 2219946 | 9/2011 |
| EP | 2687675 | 1/2014 |
| FR | 899601 | 6/1945 |
| FR | 928687 | 12/1947 |
| GB | 456335 | 11/1936 |
| GB | 464489 | 4/1937 |
| GB | 468064 | 6/1937 |
| GB | 471371 | 9/1937 |
| GB | 588069 | 5/1947 |
| GB | 597200 A | 1/1948 |
| GB | 668863 | 3/1952 |
| GB | 770647 | 3/1957 |
| GB | 934403 | 8/1963 |
| JP | 11200986 | 7/1999 |
| WO | 02/48517 | 6/2002 |
| WO | 2016042709 | 3/2016 |

* cited by examiner

COMPOUND ENGINE ASSEMBLY WITH COMMON INLET

CROSS-REFERENCE TO RELATED APPLICATIONS

This application claims priority from U.S. provisional application No. 62/118,891 filed Feb. 20, 2015, the entire contents of which are incorporated by reference herein.

TECHNICAL FIELD

The application relates generally to compound engine assemblies and, more particularly, to supercharged or turbocharged compound engine assemblies used in aircraft.

BACKGROUND OF THE ART

Compound engine assemblies including a compressor used as a supercharger or turbocharger may define a relatively bulky assembly which may be difficult to fit into existing aircraft nacelles, thus creating some difficulty in adapting them for aircraft applications.

SUMMARY

In one aspect, there is provided a compound engine assembly comprising: an air conduit having an inlet in fluid communication with ambient air around the compound engine assembly; a compressor having an inlet in fluid communication with the air conduit; an engine core including at least one internal combustion engine each having a rotor sealingly and rotationally received within a respective internal cavity to provide rotating chambers of variable volume in the respective internal cavity, the engine core having an inlet in fluid communication with an outlet of the compressor; a turbine section having an inlet in fluid communication with an outlet of the engine core, the turbine section configured to compound power with the engine core; and at least one heat exchanger in fluid communication with the air conduit, each of the at least one heat exchanger configured to circulate a fluid of the engine assembly in heat exchange relationship with an airflow from the air conduit circulating therethrough.

In another aspect, there is provided a compound engine assembly comprising: a compressor; an engine core including at least one rotary internal combustion engine in driving engagement with an engine shaft, the engine core having an inlet in fluid communication with an outlet of the compressor; a turbine section having an inlet in fluid communication with an outlet of the engine core, the turbine section including at least one turbine rotor engaged on a rotatable turbine shaft, the turbine shaft and the engine shaft being engaged to a same rotatable load; at least one heat exchanger configured to circulate a fluid of the engine assembly in heat exchange relationship with an airflow circulating therethrough; and a common air conduit having an inlet in fluid communication with ambient air around the compound engine assembly, the common air conduit in fluid communication with an inlet of the compressor and with the at least one heat exchanger.

In a further aspect, there is provided a method of supplying air to a compound engine assembly, the method comprising: directing ambient air from outside of the compound engine assembly into the compound engine assembly through an inlet of an air conduit; directing the air from the air conduit through at least one heat exchanger to cool a fluid of the compound engine assembly and from the air conduit to an inlet of a compressor of the compound engine assembly; and directing compressed air from the compressor into an engine core of the compound engine assembly, the engine core including at least one rotary internal combustion engine creating an exhaust flow driving a turbine section of the compound engine assembly and compounding power with the turbine section to drive rotation of a common load.

DESCRIPTION OF THE DRAWINGS

Reference is now made to the accompanying figures in which.

DETAILED DESCRIPTION

Described herein are a compound engine assembly 10 and its installation for a propeller airplane. In the embodiment shown, the compound engine assembly 10 includes a liquid cooled heavy fueled multi-rotor rotary engine core 12 and a turbine section 18 used as an exhaust energy recovery system. As will be detailed below, other configurations for the engine core 12 are also possible.

Figure 1:
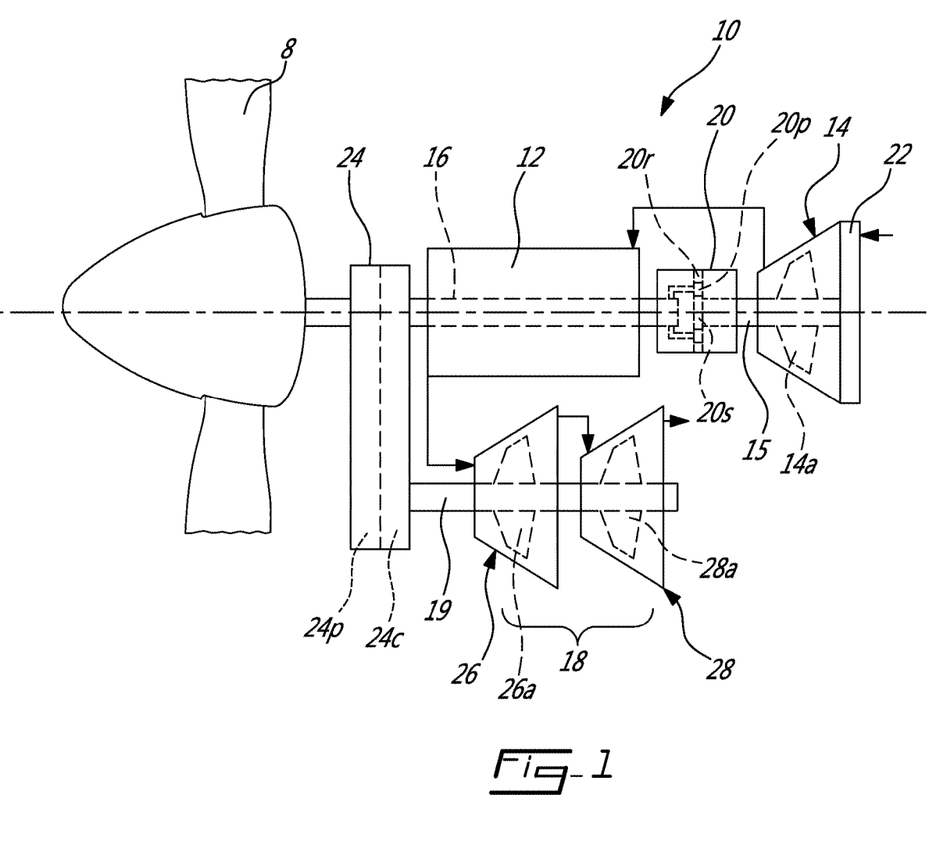
FIG. 1 is a schematic view of a compound engine assembly in accordance with a particular embodiment.

Referring to FIG. 1, the engine core 12 has an engine shaft 16 driven by the rotary engine(s) and driving a rotatable load, which is shown here as a propeller 8. It is understood that the compound engine assembly 10 may alternately be configured to drive any other appropriate type of load, including, but not limited to, one or more generator(s), drive shaft(s), accessory(ies), rotor mast(s), compressor(s), or any other appropriate type of load or combination thereof. The compound engine assembly 10 further includes a compressor 14, and a turbine section 18 compounding power with the engine core 12.

Figure 2:
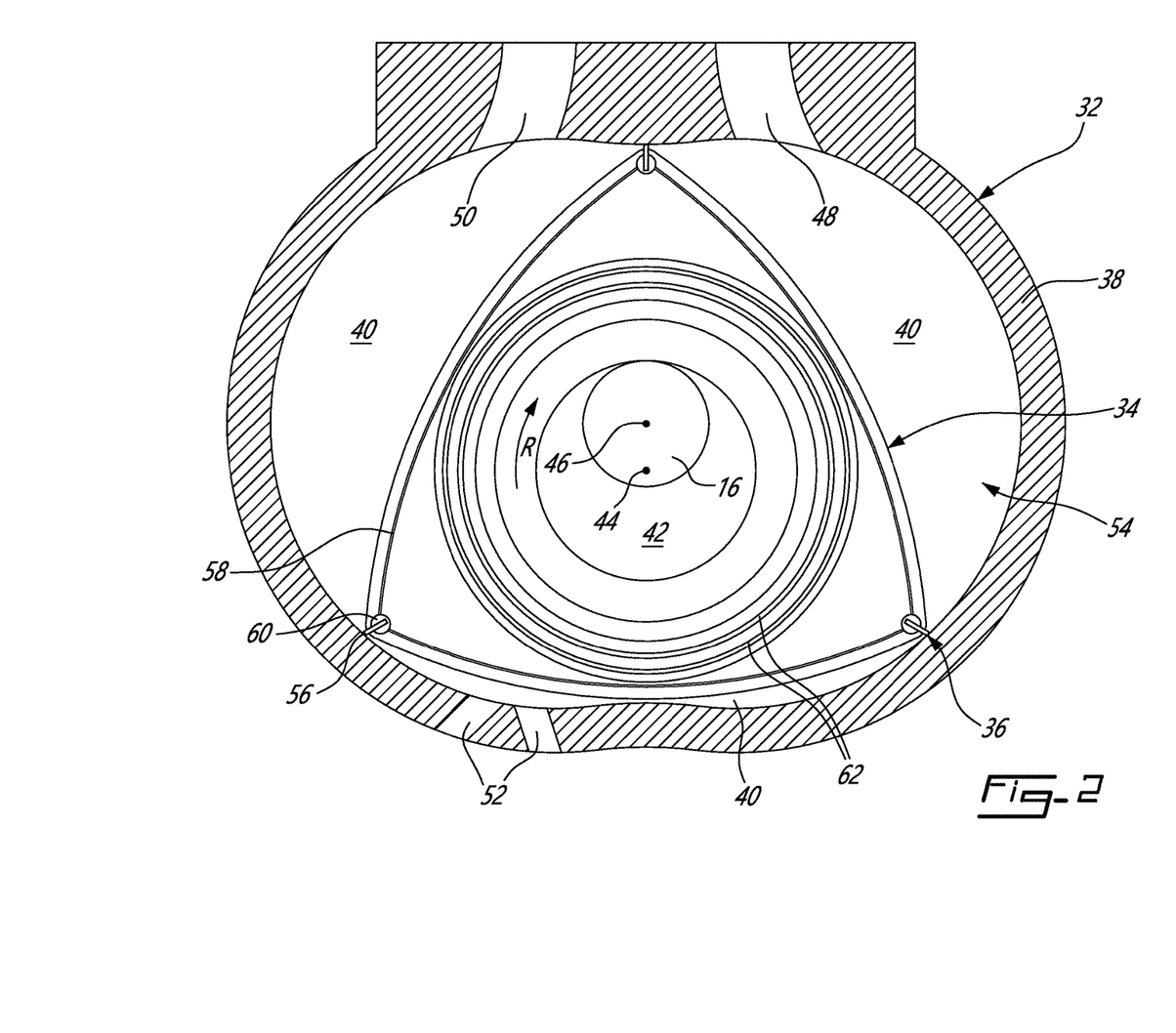
FIG. 2 is a cross-sectional view of a Wankel engine which can be used in a compound engine assembly such as shown in FIG. 1, in accordance with a particular embodiment.

The engine core 12 may include 2, 3, 4 or more rotary engines drivingly engaged to the shaft 16. In another embodiment, the engine core 12 includes a single rotary engine. Each rotary engine has a rotor sealingly engaged in a respective housing, with each rotary engine having a near constant volume combustion phase for high cycle efficiency. The rotary engine(s) may be Wankel engine(s). Referring to FIG. 2, an exemplary embodiment of a Wankel engine is shown. Each Wankel engine comprises a housing 32 defining an internal cavity with a profile defining two lobes, which is preferably an epitrochoid. A rotor 34 is received within the internal cavity. The rotor defines three circumferentially-spaced apex portions 36, and a generally triangular profile with outwardly arched sides. The apex portions 36 are in sealing engagement with the inner surface of a peripheral wall 38 of the housing 32 to form three working chambers 40 between the rotor 34 and the housing 32.

The rotor 34 is engaged to an eccentric portion 42 of the shaft 16 to perform orbital revolutions within the internal cavity. The shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the internal cavity to undergo the four phases of intake, compression, expansion and exhaust.

An intake port 48 is provided through the peripheral wall 38 for successively admitting compressed air into each working chamber 40. An exhaust port 50 is also provided through the peripheral wall 38 for successively discharging the exhaust gases from each working chamber 40. Passages 52 for a glow plug, spark plug or other ignition element, as well as for one or more fuel injectors (not shown) are also provided through the peripheral wall 38. Alternately, the intake port 48, the exhaust port 50 and/or the passages 52 may be provided through an end or side wall 54 of the housing; and/or, the ignition element and a pilot fuel injector may communicate with a pilot subchamber (not shown) defined in the housing 32 and communicating with the internal cavity for providing a pilot injection. The pilot subchamber may be for example defined in an insert (not shown) received in the peripheral wall 38.

In a particular embodiment the fuel injectors are common rail fuel injectors, and communicate with a source of Heavy fuel (e.g. diesel, kerosene (jet fuel), equivalent biofuel), and deliver the heavy fuel into the engine(s) such that the combustion chamber is stratified with a rich fuel-air mixture near the ignition source and a leaner mixture elsewhere.

For efficient operation the working chambers 40 are sealed, for example by spring-loaded apex seals 56 extending from the rotor 34 to engage the peripheral wall 38, and spring-loaded face or gas seals 58 and end or corner seals 60 extending from the rotor 34 to engage the end walls 54. The rotor 34 also includes at least one spring-loaded oil seal ring 62 biased against the end wall 54 around the bearing for the rotor 34 on the shaft eccentric portion 42.

Each Wankel engine provides an exhaust flow in the form of a relatively long exhaust pulse; for example, in a particular embodiment, each Wankel engine has one explosion per 360° of rotation of the shaft, with the exhaust port remaining open for about 270° of that rotation, thus providing for a pulse duty cycle of about 75%. By contrast, a piston of a reciprocating 4-stroke piston engine typically has one explosion per 720° of rotation of the shaft with the exhaust port remaining open for about 180° of that rotation, thus providing a pulse duty cycle of 25%.

In a particular embodiment which may be particularly but not exclusively suitable for low altitude, each Wankel engine has a volumetric expansion ratio of from 5 to 9, and operates following the Miller cycle, with a volumetric compression ratio lower than the volumetric expansion ratio, for example by having the intake port located closer to the top dead center (TDC) than an engine where the volumetric compression and expansion ratios are equal or similar. Alternately, each Wankel engine operates with similar or equal volumetric compression and expansion ratios.

It is understood that other configurations are possible for the engine core 12. The configuration of the engine(s) of the engine core 12, e.g. placement of ports, number and placement of seals, etc., may vary from that of the embodiment shown. In addition, it is understood that each engine of the engine core 12 may be any other type of internal combustion engine including, but not limited to, any other type of rotary engine, and any other type of non-rotary internal combustion engine such as a reciprocating engine.

Referring back to FIG. 1, the rotary engine core 12 is supercharged with the compressor 14 mounted in-line with the engine core, i.e. the compressor rotor(s) 14a rotate co-axially with the engine shaft 16. In the embodiment shown, the compressor rotor(s) 14a are engaged on a compressor shaft 15, and the engine shaft 16 is in driving engagement with the compressor shaft 15 through a step-up gearbox 20. In a particular embodiment, the gearbox 20 is a planetary gear system. In a particular embodiment, the compressor shaft 15 includes a sun gear 20s which is drivingly engaged to carrier-mounted planet gears 20p, which are drivingly engaged to a fixed ring gear 20r. The rotating carrier assembly is connected to the engine shaft 16, for example through a splined connection. In a particular embodiment, the planetary gear system elements (sun gear, planet gears and ring gear) within the gearbox 20 are configured to define a speed ratio of about 7:1 between the compressor shaft 15 and engine core shaft 16. It is understood that any other appropriate configuration and/or speed ratio for the gearbox 20 may alternately be used.

In the embodiment shown and referring particularly to FIG. 1, the compressor 14 is a centrifugal compressor with a single rotor 14a. Other configurations are alternately possible. The compressor 14 may be single-stage device or a multiple-stage device and may include one or more rotors having radial, axial or mixed flow blades.

The outlet of the compressor 14 is in fluid communication with the inlet of the engine core 12, which corresponds to or communicates with the inlet of each engine of the engine core 12. Accordingly, air enters the compressor 14 and is compressed and circulated to the inlet of the engine core 12. In a particular embodiment, the compressor 14 includes variable inlet guide vanes 22 through which the air circulates before reaching the compressor rotor(s) 14a.

The engine core 12 receives the pressurized air from the compressor 14 and burns fuel at high pressure to provide energy. Mechanical power produced by the engine core 12 drives the propeller 8.

Each engine of the engine core 12 provides an exhaust flow in the form of exhaust pulses of high pressure hot gas exiting at high peak velocity. The outlet of the engine core 12 (i.e. the outlet of each engine of the engine core 12) is in fluid communication with the inlet of the turbine section 18, and accordingly the exhaust flow from the engine core 12 is supplied to the turbine section 18.

The turbine section 18 includes at least one rotor engaged on a turbine shaft 19. Mechanical energy recovered by the turbine section 18 is compounded with that of the engine shaft 16 to drive the propeller 8. The turbine shaft 19 is mechanically linked to, and in driving engagement with, the engine shaft 16 through a reduction gearbox 24, for example through an offset gear train with idler gear. In a particular embodiment, the elements of the reduction gearbox 24 (e.g. offset gear train) are configured to define a reduction ratio of approximately 5:1 between the turbine shaft 19 and the engine shaft 16. The engine shaft 16 is also mechanically linked to, and in driving engagement with, the propeller 8 through the same reduction gearbox 24. In a particular embodiment, the reduction gearbox 24 includes two gear train branches: a compounding branch 24c mechanically linking the turbine shaft 19 and the engine shaft 16 and a downstream planetary branch 24p mechanically linking the engine shaft 16 and propeller 8. In another embodiment, the turbine shaft 19 and engine shaft 16 may be engaged to the propeller 8 through different gearboxes, or the turbine shaft 19 may be engaged to the engine shaft 16 separately from the engagement between the engine shaft 16 and the propeller 8. In particular embodiment, the turbine shaft 19 is engaged to the compressor gearbox 20.

Figure 3:
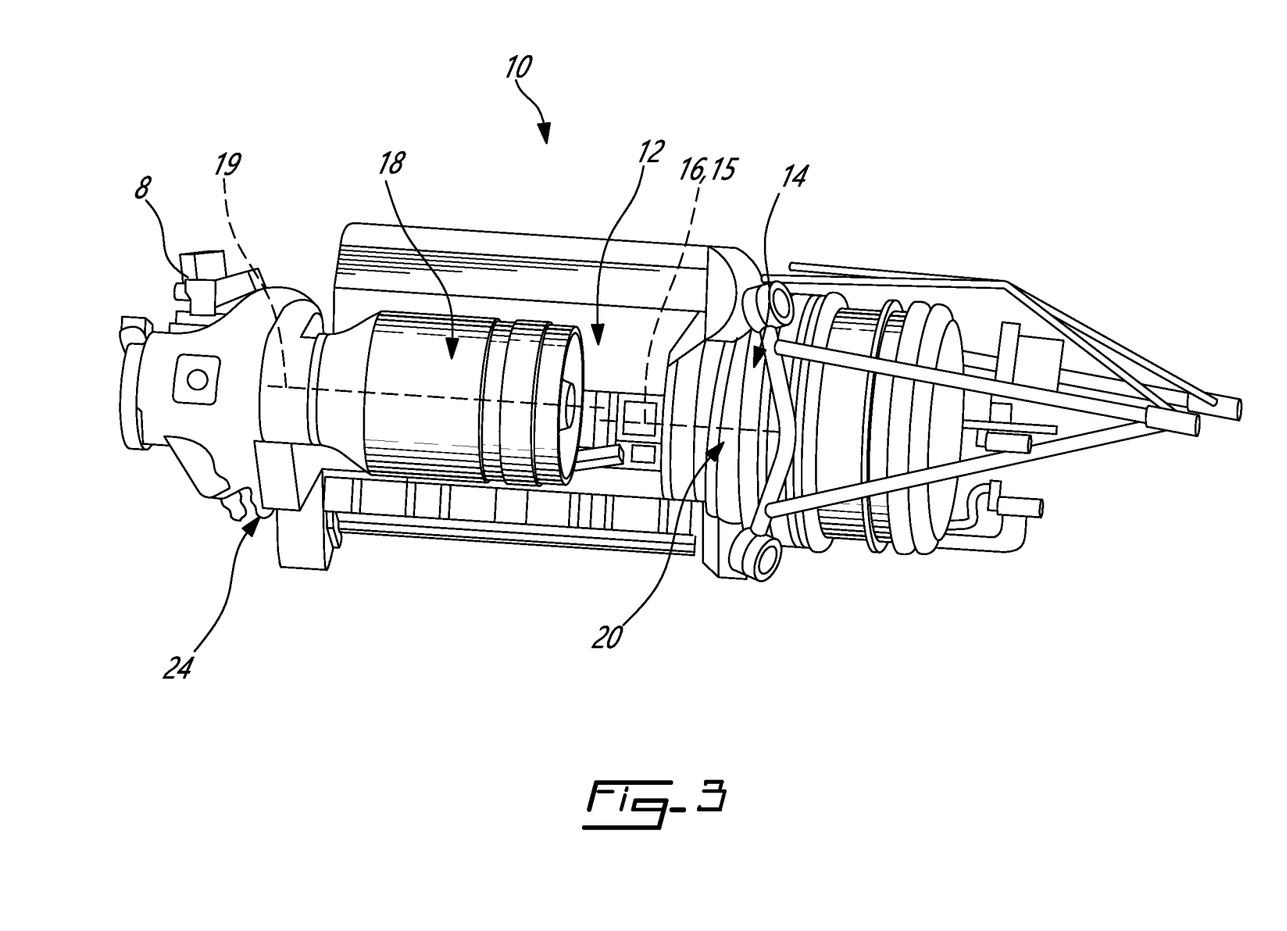
FIG. 3 is a schematic tridimensional view of the compound engine assembly of FIG. 1 in accordance with a particular embodiment.

As can be seen in FIGS. 1 and 3, the turbine shaft 19 is parallel to and radially offset from (i.e., non-coaxial to) the engine shaft 16 and compressor shaft 15. The compressor rotor(s) 14a and engine shaft 16 are thus rotatable about a common axis (central axis of the compressor and engine shafts 15, 16) which is parallel to and radially offset from the axis of rotation of the turbine rotor(s) 26a, 28a (central axis of the turbine shaft 19). In a particular embodiment, the offset configuration of the turbine section 18 allows for the turbine section 18 to be enclosed in a casing separate from that of the engine core 12 and the compressor 14, such that the turbine section 18 is modular and removable (e.g. removable on-wing) from the remainder of the compound engine assembly 10.

Referring particularly to FIG. 1, the turbine section 18 may include one or more turbine stages. In a particular embodiment, the turbine section 18 includes a first stage turbine 26 receiving the exhaust from the engine core 12, and a second stage turbine 28 receiving the exhaust from the first stage turbine 26. The first stage turbine 26 is configured as a velocity turbine, also known as an impulse turbine, and recovers the kinetic energy of the core exhaust gas while creating minimal or no back pressure to the exhaust of the engine core 12. The second stage turbine 28 is configured as a pressure turbine, also known as a reaction turbine, and completes the recovery of available mechanical energy from the exhaust gas. Each turbine 26, 28 may be a centrifugal or axial device with one or more rotors having radial, axial or mixed flow blades. In another embodiment, the turbine section 18 may include a single turbine, configured either as an impulse turbine or as a pressure turbine.

A pure impulse turbine works by changing the direction of the flow without accelerating the flow inside the rotor; the fluid is deflected without a significant pressure drop across the rotor blades. The blades of the pure impulse turbine are designed such that in a transverse plane perpendicular to the direction of flow, the area defined between the blades is the same at the leading edges of the blades and at the trailing edges of the blade: the flow area of the turbine is constant, and the blades are usually symmetrical about the plane of the rotating disc. The work of the pure impulse turbine is due only to the change of direction in the flow through the turbine blades. Typical pure impulse turbines include steam and hydraulic turbines.

In contrast, a reaction turbine accelerates the flow inside the rotor but needs a static pressure drop across the rotor to enable this flow acceleration. The blades of the reaction turbine are designed such that in a transverse plane perpendicular to the direction of flow, the area defined between the blades is larger at the leading edges of the blades than at the trailing edges of the blade: the flow area of the turbine reduces along the direction of flow, and the blades are usually not symmetrical about the plane of the rotating disc. The work of the pure reaction turbine is due mostly to the acceleration of the flow through the turbine blades.

Most aeronautical turbines are not "pure impulse" or "pure reaction", but rather operate following a mix of these two opposite but complementary principles—i.e. there is a pressure drop across the blades, there is some reduction of flow area of the turbine blades along the direction of flow, and the speed of rotation of the turbine is due to both the acceleration and the change of direction of the flow. The degree of reaction of a turbine can be determined using the temperature-based reaction ratio (equation 1) or the pressure-based reaction ratio (equation 2), which are typically close to one another in value for a same turbine:

$$\text{Reaction}(T) = \frac{(t_{S3} - t_{S5})}{(t_{S0} - t_{S5})} \quad (1)$$

$$\text{Reaction}(P) = \frac{(P_{S3} - P_{S5})}{(P_{S0} - P_{S5})} \quad (2)$$

where T is temperature and P is pressure, s refers to a static port, and the numbers refers to the location the temperature or pressure is measured: 0 for the inlet of the turbine vane (stator), 3 for the inlet of the turbine blade (rotor) and 5 for the exit of the turbine blade (rotor); and where a pure impulse turbine would have a ratio of 0 (0%) and a pure reaction turbine would have a ratio of 1 (100%).

In a particular embodiment, the first stage turbine 26 is configured to take benefit of the kinetic energy of the pulsating flow exiting the engine core 12 while stabilizing the flow and the second stage turbine 28 is configured to extract energy from the remaining pressure in the flow while expanding the flow. Accordingly, the first stage turbine 26 has a smaller reaction ratio than that of the second stage turbine 28.

In a particular embodiment, the second stage turbine 28 has a reaction ratio higher than 0.25; in another particular embodiment, the second stage turbine 28 has a reaction ratio higher than 0.3; in another particular embodiment, the second stage turbine 28 has a reaction ratio of about 0.5; in another particular embodiment, the second stage turbine 28 has a reaction ratio higher than 0.5.

In a particular embodiment, the first stage turbine 26 has a reaction ratio of at most 0.2; in another particular embodiment, the first stage turbine 26 has a reaction ratio of at most 0.15; in another particular embodiment, the first stage turbine 26 has a reaction ratio of at most 0.1; in another particular embodiment, the first stage turbine 26 has a reaction ratio of at most 0.05.

It is understood that any appropriate reaction ratio for the second stage turbine 28 (included, but not limited to, any of the above-mentioned reaction ratios) can be combined with any appropriate reaction ratio for the first stage turbine 26 (included, but not limited to, any of the above-mentioned reaction ratios), and that these values can correspond to pressure-based or temperature-based ratios. Other values are also possible. For example, in a particular embodiment, the two turbines 26, 28 may have a same or similar reaction ratio; in another embodiment, the first stage turbine 26 has a higher reaction ratio than that of the second stage turbine 28. Both turbines 26, 28 may be configured as impulse turbines, or both turbines 26, 28 may be configured as pressure turbines.

In an embodiment where the engine core 12 includes one or more rotary engine(s) each operating with the Miller cycle, the compressor pressure ratio and the turbine section pressure ratio may be higher than a similar engine assembly where the engine core includes one or more rotary engine(s) having similar or equal volumetric compression and expansion ratios. The higher pressure ratio in the turbine section may be accommodated by additional axial turbine stage(s), an additional radial turbine, and/or a combination of axial and radial turbines suitable to accept the higher pressure ratio.

Figure 4:
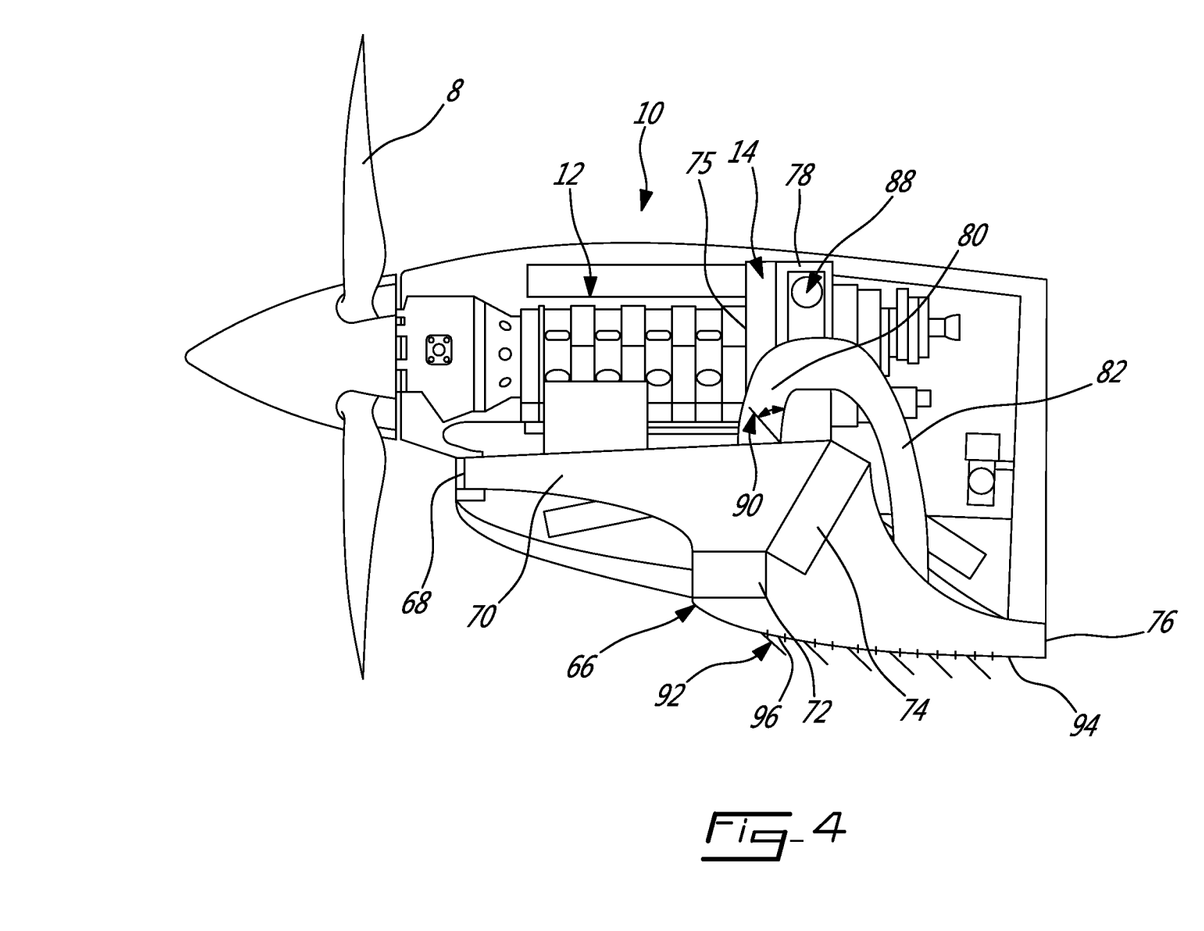
FIG. 4 is a schematic cross-sectional view of a nacelle installation of the compound engine assembly of FIG. 3, in accordance with a particular embodiment.

Referring to FIG. 4, a nacelle installation of the compound engine assembly 10 according to a particular embodiment is shown. The installation includes an intake assembly 66 which features a common inlet 68 and air conduit 70 for the engine assembly (through the compressor 14) and the oil and coolant heat exchangers 72, 74. The air conduit 70 extends from the inlet 68 to an opposed outlet 76. The inlet 68 and outlet 76 of the air conduit 70 communicate with ambient air outside of or around the assembly 10, for example ambient air outside of a nacelle receiving the assembly. In the embodiment shown, the ambient air penetrates the compound engine assembly 10 through the inlet 68 of the air conduit 70—the inlet 68 of the air conduit 70 thus defines a nacelle inlet, i.e. an inlet of the assembly 10 as a whole.

It can be seen that the heat exchangers 72, 74 extend across the air conduit 70, such that the airflow through the air conduit 70 circulates through the heat exchangers 72, 74. In the embodiment shown, the heat exchangers 72, 74 include an oil heat exchanger 72 which receives the oil from the engine assembly oil system and circulates it in heat exchange relationship with the airflow, such as to cool the oil; and a coolant heat exchanger 74 which receives the coolant from the engine core 12 (e.g. water, oil or other liquid coolant) and circulates it in heat exchange relationship with the airflow, such as to cool the coolant. Although two heat exchangers 72, 74 are shown, it is understood that alternately a single heat exchanger or more than two heat exchangers may be provided in the air conduit 70. The two heat exchangers 72, 74 are shown as being placed in parallel, such that a portion of the airflow separately circulates through each heat exchanger. Alternately, the heat exchangers 72, 74 may be placed in the air conduit 70 in series such that the same portion of the airflow circulates through one than through the other of the heat exchangers, although such a configuration may necessitate the use of larger heat exchangers. It is also understood that the angle of the heat exchangers 72, 74 within the conduit 70 may be different from that shown. In a particular embodiment, the angle of the heat exchangers 72, 74 with respect to the airflow within the conduit 70 is selected to obtain a desired balance between pressure losses and effectiveness of the heat exchangers, in consideration of the available space within the conduit 70.

The intake assembly 66 includes an intake plenum 78 configured for connection to and fluid communication with the inlet of the compressor 14. In the embodiment shown and as can be more clearly seen in FIG. 5, the intake plenum 78 is annular. Other configurations are possible.

Figure 5:
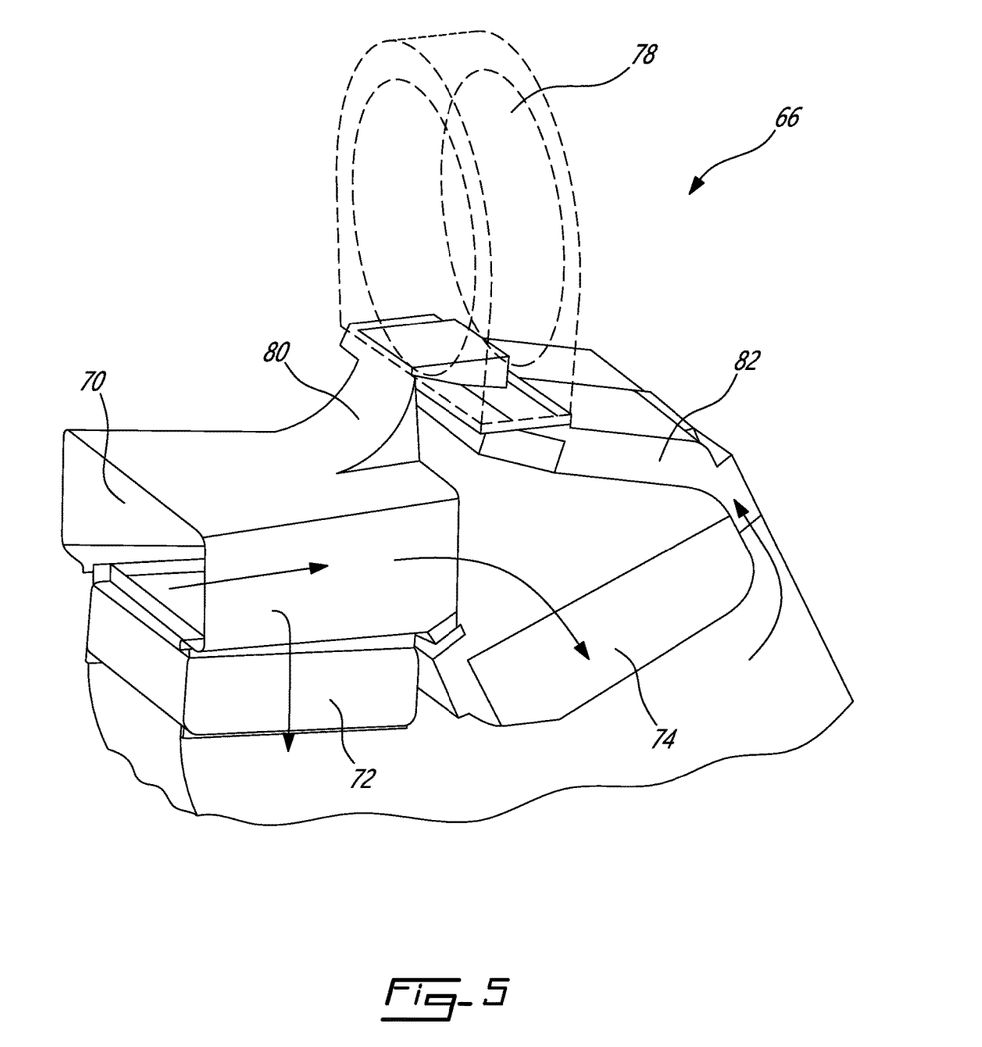
FIG. 5 is a schematic tridimensional view of an intake assembly of the compound engine assembly of FIG. 4, in accordance with a particular embodiment.
Figure 6A:
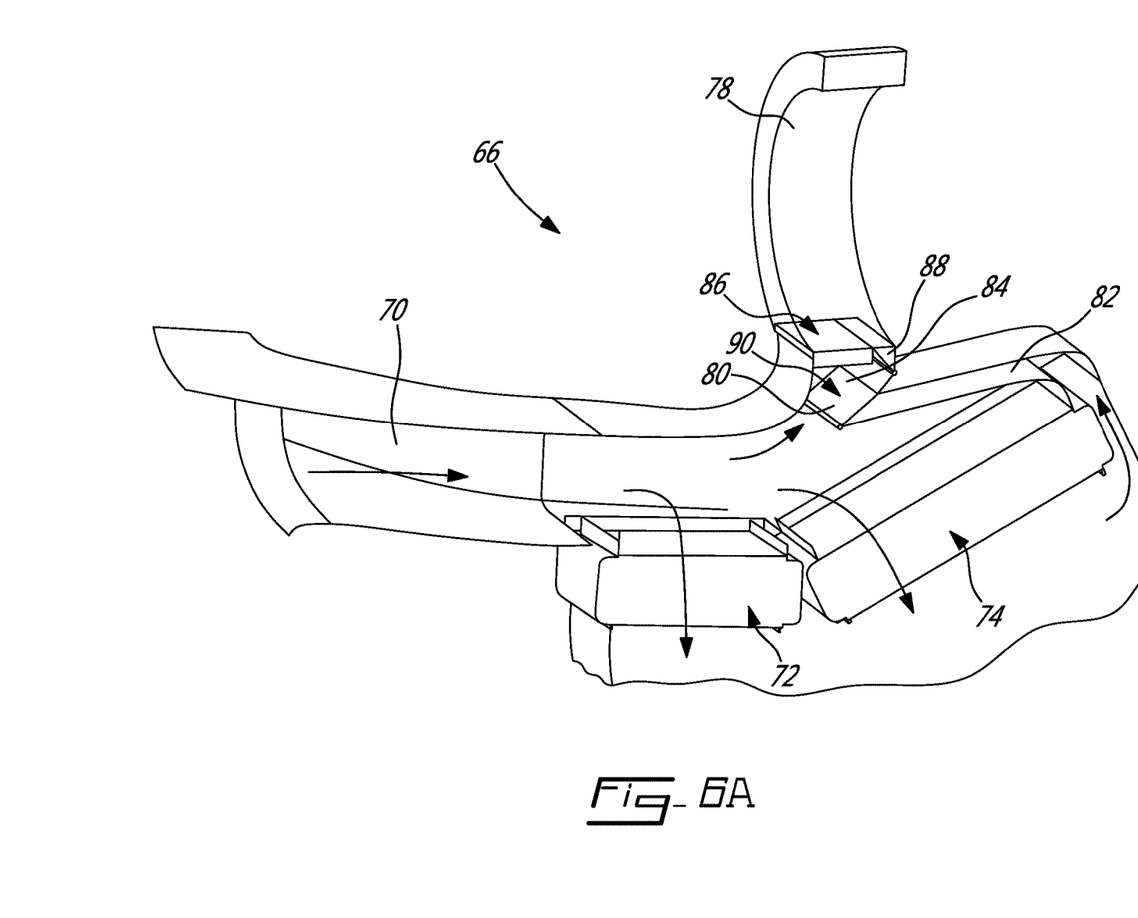
FIG. 6A is a schematic side cross-sectional view of part of the intake assembly of FIG. 5.

Referring to FIGS. 4, 5 and 6A, the intake assembly 66 includes first and second intake conduits 80, 82 providing fluid communication between the air conduit 70 and the intake plenum 78. The first intake conduit 80 is connected to the air conduit 70 upstream of the heat exchangers 72, 74, so that the portion of the air conduit 70 upstream of the heat exchangers 72, 74 defines a first source of air. The second intake conduit 82 is connected to the air conduit 70 downstream of the heat exchangers 72, 74, so that the portion of the air conduit 70 downstream of the heat exchangers 72, 74 defines a second source of air warmer than the first source. In the embodiment shown and as can be more clearly seen in FIG. 4, the air conduit 70 is configured to define a diffuser upstream of the heat exchangers 72, 74, such as to decelerate the flow to a low velocity flow at the inlet of the heat exchangers 72, 74. The first intake conduit 80 is connected in the diffuser; in a particular embodiment, the first intake conduit 80 is connected to the air conduit 70 where air velocity is at a minimum. Such a configuration may allow for minimizing of pressure losses.

Figure 6B:
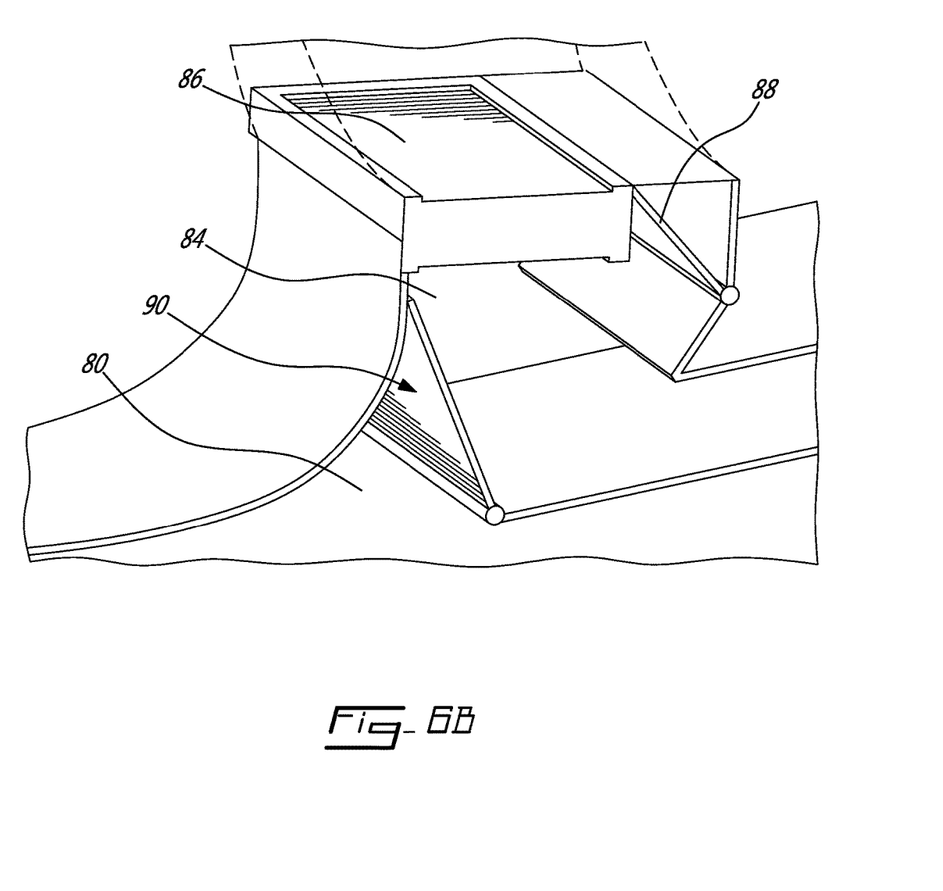
FIG. 6B is an enlarged schematic side cross-sectional view of part of the intake assembly of FIG. 6A.

Referring to FIGS. 6A-6B, in a particular embodiment, the intake conduits 80, 82 are in fluid communication with the intake plenum 78 through an engine intake 84 containing an air filter 86. An air filter bypass valve 88 is provided in the engine intake 84 to allow airflow to the intake plenum 78 around the air filter 86 in case of inadvertent air filter blockage. In a particular embodiment, the air filter bypass valve 86 is a spring loaded pressure differential operated valve.

The intake assembly 66 further includes a selector valve 90 positioned upstream of the air filter 86 and allowing for the selection of the intake conduit 80, 82 used to circulate the air from the air conduit 70 to the intake plenum 78. The selector valve 90 is thus configurable between a configuration where the fluid communication between the intake plenum 78 and the air conduit 70 through the first intake conduit 80 is allowed and a configuration where the fluid communication between the intake plenum 78 and the air conduit 70 through the first intake conduit 80 is prevented.

In the particular embodiment shown in FIG. 4, the selector valve 90 only acts to selectively block or prevent the communication through the first intake conduit 80, i.e. the intake conduit connected to the air conduit 70 upstream of the heat exchangers 72, 74. The communication through the second intake conduit 82 remains open in both configurations.

In the particular embodiment shown in FIGS. 6A and 6B, the selector valve 90 is provided at a junction between the two intake conduits 80, 82, and acts to selectively block or prevent the communication through both intake conduits 80, 82. Accordingly, in the configuration shown in FIG. 6A, the selector valve 90 allows the fluid communication between the intake plenum 78 and the air conduit 70 through the first intake conduit 80 while preventing the fluid communication between the intake plenum 78 and the air conduit 70 through the second intake conduit 82; and in the configuration shown in FIG. 6B, the selector valve 90 prevents the fluid communication between the intake plenum 78 and the air conduit 70 through the first intake conduit 80 while allowing the fluid communication between the intake plenum 78 and the air conduit 70 through the second intake conduit 82. In the embodiments shown, the selector valve 90 includes a flap pivotable between the two configurations, and blocks the communication through one or the other of the intake conduits 80, 82 by blocking the communication between that intake conduit 80, 82 and the intake plenum 78. Other types of valves 90 and/or valve positions are also possible.

The selector valve 90 thus allows for the selection of cooler air (first intake conduit 80, taking air upstream of the heat exchangers 72, 74) or warmer air (second intake conduit 82, taking air downstream of the heat exchangers 72, 74) to feed the compressor 14 and engine assembly 10, based on the operating conditions of the engine assembly 10. For example, in icing conditions, the fluid communication through the second conduit 82 may be selected by blocking the fluid communication through the first conduit 80, so that that the warmer air from downstream of the heat exchangers 72, 74 is used to feed the compressor 14, such as to provide de-icing capability for the engine intake 84, air filter 86, intake plenum 78 and compressor inlet with fixed and variable geometries; and in non-icing flight conditions, the fluid communication through the first conduit 80 may be selected so that colder air is used to feed the compressor 14 to provide for better engine performance (as compared to hotter air).

Also, selection of the flow through the second intake conduit 82 to extract the engine air downstream of the heat exchangers 72, 74 can be used to generate airflow through the heat exchangers 72, 74. For example, for a turboprop engine at ground idle, there is no inlet ram pressure to force air through the air conduit 70 and heat exchangers 72, 74, and the propeller pressure rise may not be sufficient to draw enough air to provide sufficient cooling in the heat exchangers 72, 74; similar conditions may occur at taxi operations on the ground (engine at low power). Extracting the engine air downstream of the heat exchangers 72, 74 produces a "sucking" effect pulling the air through the heat exchangers 72, 74, which in a particular embodiment may allow for sufficient cooling without the need of a fan or blower to provide for the necessary air circulation. A bleed-off Valve 75 can optionally be provided downstream of the compressor 14 and upstream of the engine core 12 (i.e. in the fluid communication between the compressor outlet and the engine core inlet), and opened during idle or taxi operation to increase compressor flow such as to increase the "sucking" effect of extracting the engine air downstream of the heat exchangers 72, 74, and accordingly increase the airflow through the heat exchangers 72, 74. Moreover, an intercooler may optionally be provided just upstream of the engine core 12 to cool the compressor flow prior to routing it to the engine core.

In a particular embodiment, the engine intake assembly 66 can be configured as an inertial particle separator when the fluid communication through the first conduit 80 is selected, so that when the air from upstream of the heat exchangers 72, 74 is used to feed the engine, the heavy particles are entrained downstream of the heat exchangers 72, 74. In the embodiment shown in FIG. 4, the junction between the first conduit 80 and the air conduit 70 is configured as the inertial particle separator: the first conduit 80 defines a sharp turn with respect to the air conduit 70 (e.g. by extending close to or approximately perpendicular thereto), extending at a sufficient angle from the air conduit 70 such that the heavier particles (e.g. ice, sand) continue on a straight path while the air follows the sharp turn, and by the first conduit 80 and air conduit 70 are sized to achieve adequate air velocities to ensure separation of the particles.

In the embodiment shown, the air conduit 70 is configured such that all of the air entering the air conduit 70 is circulated through the heat exchangers 72, 74 and/or to the intake plenum 78. Alternately, a bypass conduit could be provided such that a portion of the air entering the conduit 70 is diverted from (i.e. bypasses) the heat exchangers 72, 74 and the intake plenum 78 and is instead directly circulated to the outlet 76. In a particular embodiment, the junction between the bypass conduit and the air conduit 70 is configured as the inertial particle separator, through selection of an appropriate orientation and relative sizing of the bypass conduit with respect to the air conduit 70.

Figure 7:
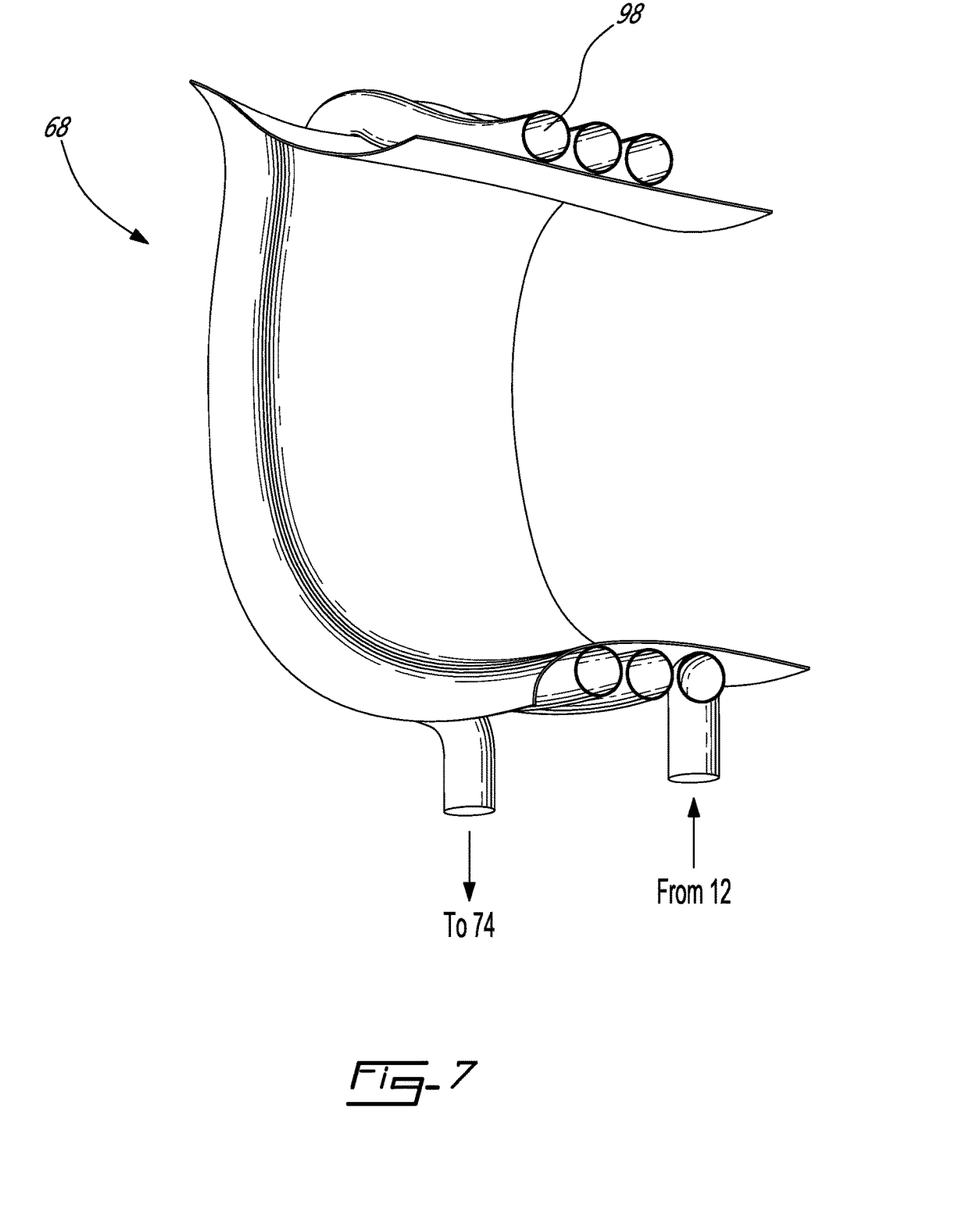
FIG. 7 is a schematic tridimensional view of an inlet lip of the intake assembly of FIG. 5, in accordance with a particular embodiment.

In a particular embodiment and as shown in FIG. 7, the lip of the assembly inlet 68 is de-iced by circulating hot coolant through a coil tube 98 disposed in the lip and made of material having appropriate heat conduction properties. The coil tube 98 has an inlet in fluid communication with the coolant system of the engine core 12 and an outlet in fluid communication with the coolant heat exchanger 74, such that a fraction of the hot coolant flowing out of the engine core 12 is routed to the coil tube 98 of the inlet lip 68 for de-icing, and then rejoins the remainder of the hot coolant flow from the engine core 12 prior to sending the flow to the heat exchanger 74.

Although in the embodiment shown the heat exchangers 72, 74 and engine assembly 10 have a common inlet 68 and the first and second intake conduits 80, 82 communicate with a same air conduit 70 extending from that inlet, it is understood that alternately the engine assembly 10 and heat exchangers 72, 74 may have separate inlets. The first intake conduit 80 may thus communicate with a source of fresh air separate from that feeding the heat exchangers 72, 74.

Alternately, the common inlet 68 and air conduit 70 used to feed the heat exchangers 72, 74 and the compressor 14 may be used with a single intake conduit providing the fluid communication between the intake plenum 78 and the air conduit 70, and connected to the air conduit 70 at any appropriate location (downstream or upstream of the heat exchangers).

Referring back to FIG. 4, in a particular embodiment, variable cowl flaps 92 are pivotally connected to an outer wall 94 of the air conduit 70 downstream of the heat exchangers 72, 74, each adjacent a respective opening 96 defined through the outer wall 94. The flaps 92 are movable between an extended position (shown) where they extend away from the respective opening 96 and a retracted position where they close the respective opening 96, such as to modulate the airflow through the air conduit 70 and heat exchangers 72, 74. The openings 96 communicate with ambient air outside of or around the assembly 10 when the flaps are extended, for example ambient air outside of a nacelle receiving the assembly, such that air from the air conduit 70 may exit the conduit through the openings 96. In a particular embodiment, the cowl flaps 92 are positioned in accordance with the power demand on the engine assembly 10, such as to regulate the temperature of the oil and coolant being cooled in the heat exchangers 72, 74 while reducing or minimizing cooling drag; for example, the cowl flaps 92 are open at take-off and closed at cruise speed.

The cowl flaps 92 may have any appropriate configuration. For example, in a particular embodiment, the cowl flaps 92 have a straight airfoil shape; in another embodiment, the cowl flaps 92 have a cambered airfoil shape, configured to flow the exit air horizontally to produce a more effective thrust. In a particular embodiment, the cowl flaps 92 are configured as louvers, each connected to a rod, and an actuator slides the rod to pivot the cowl flaps 92 between the extended and retracted positions to open or close the louvers. Other configurations are also possible.

In a particular embodiment, the air conduit outlet 76 downstream of the cowl flaps 92 is shaped to define a nozzle, to form an exit jet opening. In a particular embodiment, the configuration of the nozzle is optimized to minimize the drag induced by the heat exchangers 72, 74 at the cruise speed operating conditions.

Although any of the above described and shown features and any combination thereof may provide for a suitable configuration to be used as a turboprop engine and/or be received in an aircraft nacelle, in a particular embodiment, the combination of all of the above described and shown features of the compound engine assembly provide for an engine configuration specifically tailored for use as an aircraft turboprop engine.

The above description is meant to be exemplary only, and one skilled in the art will recognize that changes may be made to the embodiments described without departing from the scope of the invention disclosed. For example, although the engine assembly has been described as a compound engine assembly, it is understood that elements of the compound engine assembly can be used with non-compounded engine assemblies, and with compound engine assemblies having different configurations, for example engine assemblies where the compressor is in driving engagement with the turbine section without being directly engaged to the engine core; such elements include, but are not limited to, the intake assembly and its components. Still other modifications which fall within the scope of the present invention will be apparent to those skilled in the art, in light of a review of this disclosure, and such modifications are intended to fall within the appended claims.

The invention claimed is:

1. A compound engine assembly comprising:
   a compressor;
   an engine core including at least one internal combustion engine each having a rotor sealingly and rotationally received within a respective internal cavity to provide rotating chambers of variable volume in the respective internal cavity, the engine core having an inlet in fluid communication with an outlet of the compressor;
   a turbine section having an inlet in fluid communication with an outlet of the engine core, the turbine section configured to compound power with the engine core;
   a common air conduit having an inlet in fluid communication with ambient air around the compound engine assembly; and
   at least one heat exchanger in fluid communication with the common air conduit, each of the at least one heat exchanger configured to circulate a fluid of the engine assembly in heat exchange relationship with an airflow from the common air conduit circulating therethrough, the compressor having an inlet in fluid communication with the common air conduit upstream of the at least one heat exchanger.

2. The compound engine assembly as defined in claim 1, wherein the rotor of each of the at least one internal combustion engine has three apex portions separating the rotating chambers and mounted for eccentric revolutions within the respective internal cavity, the respective internal cavity having an epitrochoid shape with two lobes.

3. The compound engine assembly as defined in claim 1, wherein the at least one heat exchanger includes first and second heat exchangers extending in parallel across the common air conduit, the first heat exchanger in fluid communication with an oil system of the engine assembly and the second heat exchanger in fluid communication with a coolant system of the engine core.

4. The compound engine assembly as defined in claim 3, wherein the inlet of the common air conduit has a lip including a coil tube, the coil tube having an inlet in fluid communication with the coolant system of engine core and an outlet in fluid communication with the second heat exchanger to provide de-icing for the lip.

5. The compound engine assembly as defined in claim 1, wherein the turbine section includes a first stage turbine having an inlet in fluid communication with the outlet of the engine core, and a second stage turbine having an inlet in fluid communication with an outlet of the first stage turbine, the first and second stage turbines have different reaction ratios.

6. The compound engine assembly as defined in claim 1, wherein the inlet of the compressor is in fluid communication with the air conduit common through an intake conduit connected to the common air conduit upstream of the at least one heat exchanger.

7. The compound engine assembly as defined in claim 6, wherein the common air conduit defines a diffuser upstream of the at least one heat exchanger, the intake conduit being connected to the common air conduit in the diffuser.

8. The compound engine assembly as defined in claim 1, wherein the inlet of the compressor is in fluid communication with the common air conduit through a first intake conduit connected to the air conduit upstream of the at least one heat exchanger and through a second intake conduit connected to the air conduit downstream of the at least one heat exchanger, the assembly further comprising a selector valve configurable to selectively open and close at least the fluid communication between the inlet of the compressor and the first intake conduit.

9. A compound engine assembly comprising:
   a compressor;
   an engine core including at least one rotary internal combustion engine in driving engagement with an engine shaft, the engine core having an inlet in fluid communication with an outlet of the compressor;
   a turbine section having an inlet in fluid communication with an outlet of the engine core, the turbine section including at least one turbine rotor engaged on a rotatable turbine shaft, the turbine shaft and the engine shaft being engaged to a same rotatable load;
   at least one heat exchanger configured to circulate a fluid of the engine assembly in heat exchange relationship with an airflow circulating therethrough; and
   a common air conduit having an inlet in fluid communication with ambient air around the compound engine assembly, the common air conduit in fluid communication with the at least one heat exchanger, an inlet of the compressor in fluid communication with the common air conduit upstream of the at least one heat exchanger.

10. The compound engine assembly as defined in claim 9, wherein each of the at least one rotary internal combustion engine includes a rotor sealingly and rotationally received within a respective internal cavity to provide rotating chambers of variable volume in the respective internal cavity, the rotor having three apex portions separating the rotating chambers and mounted for eccentric revolutions within the respective internal cavity, the respective internal cavity having an epitrochoid shape with two lobes.

11. The compound engine assembly as defined in claim 9, wherein the at least one heat exchanger includes first and second heat exchangers extending in parallel across the common air conduit, the first heat exchanger in fluid communication with an oil system of the engine assembly and the second heat exchanger in fluid communication with a coolant system of the engine core.

12. The compound engine assembly as defined in claim 11, wherein the inlet of the common air conduit has a lip including a coil tube, the coil tube having an inlet in fluid communication with the coolant system of engine core and an outlet in fluid communication with the second heat exchanger to provide de-icing for the lip.

13. The compound engine assembly as defined in claim 9, wherein the turbine section includes a first stage turbine having an inlet in fluid communication with the outlet of the engine core, and a second stage turbine having an inlet in fluid communication with an outlet of the first stage turbine, the first and second stage turbines have different reaction ratios.

14. The compound engine assembly as defined in claim 9, wherein the inlet of the compressor is in fluid communication with the common air conduit through an intake conduit connected to the air conduit upstream of the at least one heat exchanger.

15. The compound engine assembly as defined in claim 13, wherein the air conduit defines a diffuser upstream of the at least one heat exchanger, the intake conduit being connected to the common air conduit in the diffuser.

16. The compound engine assembly as defined in claim 9, wherein the inlet of the compressor is in fluid communication with the common air conduit through a first intake conduit connected to the air conduit upstream of the at least one heat exchanger and through a second intake conduit connected to the common air conduit downstream of the at least one heat exchanger, the assembly further comprising a selector valve configurable to selectively open and close at least the fluid communication between the inlet of the compressor and the first intake conduit.

17. A method of supplying air to a compound engine assembly, the method comprising:
directing ambient air from outside of the compound engine assembly into the compound engine assembly through an inlet of an air conduit;
directing the air from the air conduit through at least one heat exchanger to cool a fluid of the compound engine assembly, and directing the air from at least a first portion of the air conduit to an inlet of a compressor of the compound engine assembly, the first portion of the air conduit located upstream of the at least one heat exchanger; and
directing compressed air from the compressor into an engine core of the compound engine assembly, the engine core including at least one rotary internal combustion engine creating an exhaust flow driving a turbine section of the compound engine assembly and compounding power with the turbine section to drive rotation of a common load.

18. The method as defined in claim 17, further comprising diffusing the air in the air conduit before directing the air through the at least one heat exchanger and to the inlet of the compressor.

19. The method as defined in claim 17, wherein directing the air through the at least one heat exchanger includes cooling a coolant of the engine core.

20. The method as defined in claim 17, further comprising directing the air to the inlet of the compressor is performed from a selected one of the first portion of the air conduit located upstream of the at least one heat exchanger and a second portion of the air conduit located downstream of the at least one heat exchanger.

* * * * *